March 3, 1936.  J. HALTENBERGER  2,032,800
OIL GAUGE
Filed April 18, 1934

INVENTOR.

Jules Haltenberger

Patented Mar. 3, 1936

2,032,800

UNITED STATES PATENT OFFICE 2,032,800

OIL GAUGE

Jules Haltenberger, Indianapolis, Ind.

Application April 18, 1934, Serial No. 721,127

2 Claims. (Cl. 73—120)

The invention forming the subject matter of the present application relates to an oil level gauge and more particularly to a dip-gauge of an automobile engine usually carried in the crankcase.

It is the object of my invention to provide a permanent magnetic tip on an oil level dip-gauge that needs to be wiped off and reinserted into the oil level before reading.

Further and more particularly expressed objects of the invention will appear as the description proceeds.

To the accomplishment of the above and related objects, my invention may be embodied in the forms illustrated in the accompanying drawing.

Figure 1:
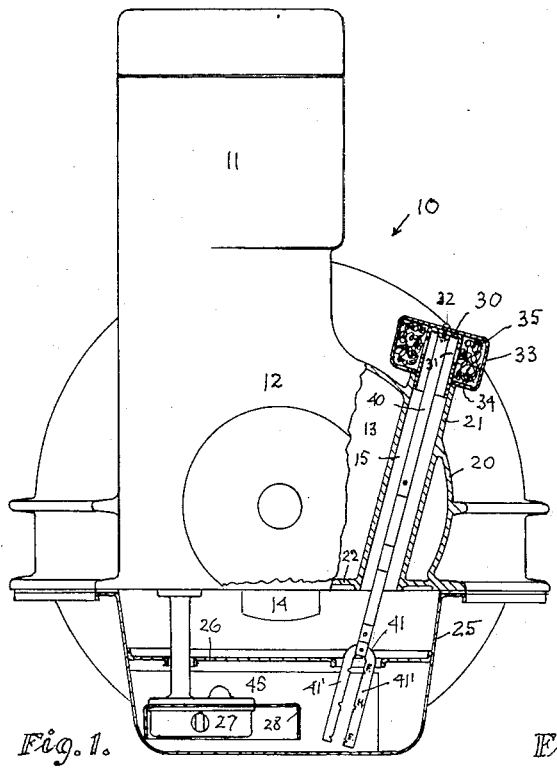
Fig. 1 is a fragmental front elevation of an automobile engine.
Figure 2:
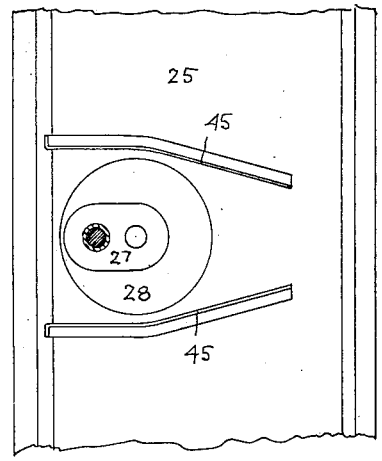
Fig. 2 is a fragmental plan view of the oil pan illustrated in Fig. 1.

Referring more particularly to the drawing and specifically to Figs. 1 and 2, it will be seen that I have illustrated therein an automobile engine generally at 10 comprising a cylinder block 11 with its integral crankcase 12, said crankcase forming a generally oil tight chamber 13. This chamber contains the usual crankshaft 14 and its associated parts. Chamber 13 contains a filling tube 15 positioned at one side and preferably between two associated cheeks of crankshaft 14 to clear said shaft without interference. Filling tube 15 is integral with crankcase 12 and joins and pierces crankcase barrel 20, protruding therefrom to form neck 21. The bottom end of filling tube 15 is connected to crankcase rib 22.

The bottom of crankcase 12 is covered by oil pan 25 containing oil tray 26, oil pump 27 and oil pump bell 28.

Neck 21 on filling tube 15 is closed by a tubular pilot 30 provided with breathing holes 31. To the pilot as by rivet 32 is connected breather-housing 33 provided with breathing holes 34. This housing is preferably filled with metal wool 35.

Rivet 32 also holds a strip metal 40 reaching through filling tube 15 into oil pan 25. At the bottom end of a strip metal 40 is attached as by a rivet a permanent magnet 41 submerged or dipping into the engine oil in oil pan 25. The two magnet prongs 41' are marked to indicate the height of oil level in said pan.

Pilot 30, breather-housing 33, strip metal 40 and magnet 41 form the principal parts of a removable unit that is normally positioned in the oil filling tube where it also serves as the crankcase breather. Said unit must be pulled out for the replenishment of the crankcase oil and at removal it serves as the oil dip-gauge. Magnet 41 will attract and hold the steel and iron particles suspended in the crankcase oil, these particles covering the surfaces of the magnet and obliterating the oil level height marking. When pulled out for oil level reading it will have to be wiped off and reinserted and again removed for reading—a routine procedure in all filling stations. By providing, however, a magnet on the oil gauge the gas station has to remove the collected iron and steel particles, thereby helping to clean the oil in the crankcase while performing a daily routine procedure.

To guide most of the oil in proximity of the magnet 41 I provide two walls 45 in oil pan 25 and as is clear from Fig. 2 these walls are placed at each side of the oil pump bell 28. These walls are shorter than the width of the oil pan, leaving a gap to communicate with the fore and aft part of oil pan 25. Substantially all the oil will pass between the two walls and will be continually cleaned by magnet 41.

Figures 3, 4:
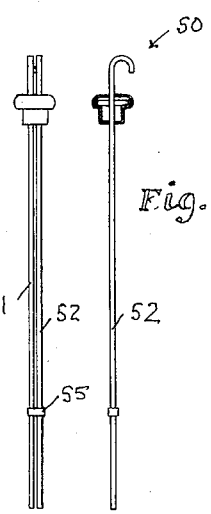
Fig. 3 is a modification of the dip-gauge illustrated in Fig. 1.
Fig. 4 is a side elevation of the gauge illustrated in Fig. 3.

Figs. 3 and 4 illustrate a magnetic dip-gauge 50 of inexpensive and simple construction to serve as a replacement for a present day non-magnetic gauge. Here magnetic prongs 51 and 52 are connected at their upper end. They pass through a pair of stampings 52 and 53 held together as by a spinning process that serve as a stem to be inserted in the usual crank-case dip-gauge opening. Prongs 51 and 52 at their lower end are clipped together by brass clip 55 which may contain the usual "Full" marking.

Figure 5:
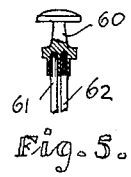
Fig. 5 is a further modification of the dip-gauge illustrated in Fig. 1.

Fig. 5 illustrates a dip-gauge head 60 in which the two magnetic prongs 61 and 62 are first knurled and then driven in drilled holes in said head.

Figure 6:
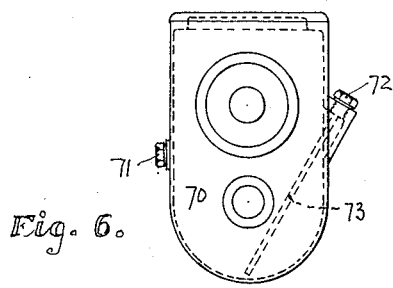
Fig. 6 is a fragmental front elevation of an automobile transmission containing a dip-gauge.

Fig. 6 illustrates a transmission housing 70 carrying oil level plug 71 and oil filler plug 72. I provide the filling plug 72 with magnetic dip-gauge prongs 73 for the purpose, as above described, that at each transmission oil replenishment it will be in a sense compulsory for the replenisher to remove the steel and iron particles and chips. When using a dip-gauge the oil level plug 71 can be dispensed with. A dip-gauge is less expensive than a drilled and tapped hole in a casing and avoids the use of a screwplug and screwplug gasket.

Figure 7:
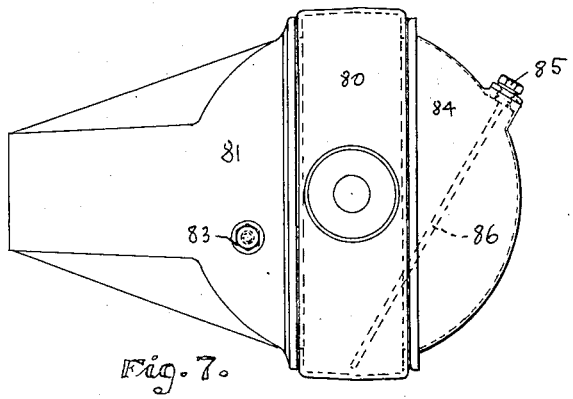
Fig. 7 is a side elevation of an automobile rear axle housing containing a dip-gauge.

Fig. 7 illustrates a rear axle banjo housing 80, differential carrier 81, oil level overflow plug 83, differential cover 84, oil filling plug 85, and magnetic prongs 86, for the purpose described above. Here, however, the location of overflow plug is of great importance. It is placed for the axle housing to contain the greatest amount of lubricant while holding the lubricant level below the axle shaft centerline to reduce the danger of oil leakage to the brakes. When an old axle housing starts to leak oil and foul the brakes, oil should be replenished to a new lower safe level, easily readable by a dip-gauge, whereas an overflow plug can indicate at best but one single level that may, after wear and usage, prove too high. This is a particular reason for using a dip-gauge for rear axle housings.

I claim as my invention:

1. An ullage rod comprising an elongated body for insertion into a motor crankcase the free end of the body being provided with a magnetic portion adapted to be immersed into a liquid in the crankcase.

2. An ullage rod comprising an elongated body for insertion into a case containing lubricant for moving parts, the free end of the body being provided with a magnetic portion adapted to be immersed into said lubricant in said case.

JULES HALTENBERGER.